United States Patent [19]

Scholefield et al.

[11] Patent Number: 4,880,149

[45] Date of Patent: Nov. 14, 1989

[54] LIQUID METERING DEVICE

[75] Inventors: John Scholefield, Kirkintilloch; Robert Johnston, Stewarton, both of Scotland

[73] Assignee: Automated Bacteria Counting Limited, Glasgow, Scotland

[21] Appl. No.: 115,062

[22] Filed: Oct. 1, 1987

Related U.S. Application Data

[63] Continuation at PCT GB87/00070 filed on Feb. 2, 1987, published as WO87/04785 on Aug. 13, 1987.

[30] Foreign Application Priority Data

Feb. 4, 1986 [GB] United Kingdom ................. 8602683

[51] Int. Cl.$^4$ .............................................. B65D 37/00
[52] U.S. Cl. .................................. 222/207; 222/152; 222/209; 222/214; 251/6; 417/474
[58] Field of Search ............... 222/152, 207, 209, 214, 222/215, 206; 251/6; 604/250, 246; 417/474, 478, 479

[56] References Cited

U.S. PATENT DOCUMENTS

| | | | |
|---|---|---|---|
| 2,094,524 | 9/1937 | Busch | 222/214 |
| 2,412,397 | 12/1946 | Harper | 222/209 X |
| 3,327,898 | 6/1967 | Farr | 222/94 X |
| 3,881,641 | 5/1975 | Pliml, Jr. et al. | 222/207 |
| 4,252,447 | 2/1981 | Borodin | 222/14 X |
| 4,282,902 | 8/1981 | Haynes | 604/250 X |

FOREIGN PATENT DOCUMENTS

| | | | |
|---|---|---|---|
| 2518505 | 6/1983 | France | |
| 0658907 | 12/1986 | Switzerland | 222/214 |

*Primary Examiner*—Joseph J. Rolla
*Assistant Examiner*—Stephen B. Parker
*Attorney, Agent, or Firm*—Saidman, Sterne, Kessler & Goldstein

[57] ABSTRACT

A liquid metering unit comprising a conduit of flexible material depending between first and second rotatable rollers, each having first and second curved surfaces and first and second flat portions. The rollers are driven in opposite directions so that their first curved surfaces impinge upon the conduit, constricting it and causing it to move upwards along its longitudinal axis such that any liquid contained therein is expelled from its lower end. Continued rotation of the rollers presents the second flat portions to the conduit, which is released and drops back to its original position. The conduit is recharged with liquid from a reservoir connected to its upper end by means of a vacuum source selectively connectable to its lower end.

8 Claims, 1 Drawing Sheet

LIQUID METERING DEVICE

This application is a continuation of PCT/GB87/00070, filed Feb. 2, 1987, published as WO87/04785 on Aug. 13, 1987.

This invention relates to metering devices for controlling dosage of a quantity of liquid and finds a use in, for example, the field of autoanalysis.

In the past, metering of sample liquids in the field of autoanalysis has required the use of a syringe which use is accompanied by problems, such as breakage and blockage of the syringe.

Other known metering devices include peristaltic pumps which have been used for biological fluids where avoidance of aeration is important. However, these pumps are designed simply to dispense a controlled dosage from a reservoir.

In autoanalysis a plurality of sample liquids from different sources must be metered correctly in order to achieve a valid analysis.

It is an object of this invention to provide a metering device which can repeatably collect an aliquot of liquid and dispense a controlled amount thereof on demand.

According to the present invention there is provided a liquid metering device comprising a resilient conduit, means for constricting said conduit and means for introducing a liquid into said conduit wherein the means for constricting said conduit comprises at least one rotatable member having a curved surface, at least one other member co-operable with the first so as to allow constriction of the conduit therebetween, means for varying the position of said conduit relative to said constriction and means whereby said members may selectively constrict the conduit to interrupt introduction of liquid thereto and release the conduit to allow introduction of liquid thereto.

Preferably, the rotatable member is a driven roller having at least one flat interrupting the cylindrical surface thereof, whereby in use a period of constriction of the conduit by means of the cylindrical surface of the roller is alternated with a period of release of the constriction by presentation of the flat(s) to said conduit, and wherein, during said period of constriction, the rotation of said driven roller causes said conduit to move along its longitudinal axis relative to said constriction.

Advantageously, said rotatable member and said other member comprise a pair of rollers of identical shape synchronised in use to constrict and release the conduit to control liquid flow in a predetermined cycle.

In an alternative embodiment said members are wholly cylindrical rollers controlled by a servo system to selectively engage the conduit to interrupt introduction of liquid thereto by constriction and release the conduit to resume liquid flow in accordance with a cycle preprogrammed into a micro processor in said system.

Preferably, a source of vacuum is connected to said conduit to cause introduction of liquid thereto.

Embodiments of the invention will now be described, by way of example only, with reference to the accompanying drawings in which.

Figure 1:
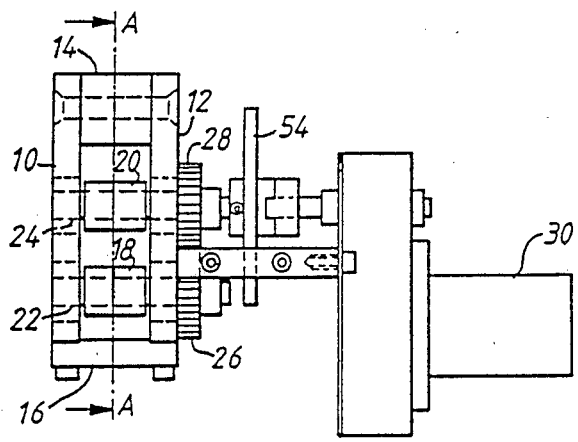
FIG. 1 is a plan view of a liquid metering device embodying the invention.

Referring now to the drawings, a liquid metering unit includes a mounting frame comprising first and second plates 10 and 12 maintained in spaced parallel relationship by first and second bridging members 14 and 16, and having first and second eccentric rollers or rotatable members 18 and 20 located therebetween. The rollers 18 and 20 are fixedly mounted upon rotatable shafts 22 and 24 extending through suitable apertures in the parallel plates 10 and 12 and having their axes parallel to one another and perpendicular to the plates 10 and 12. The shafts 22 and 24 are drivingly connected to one another by means of intermeshing gears 26 and 28 so that they, and hence the rollers 18 and 20, are synchronized and may be driven in opposite directions by any suitable drive means, such as an electric motor 30, operably coupled to one of the shafts 22 and 24.

Figure 2:
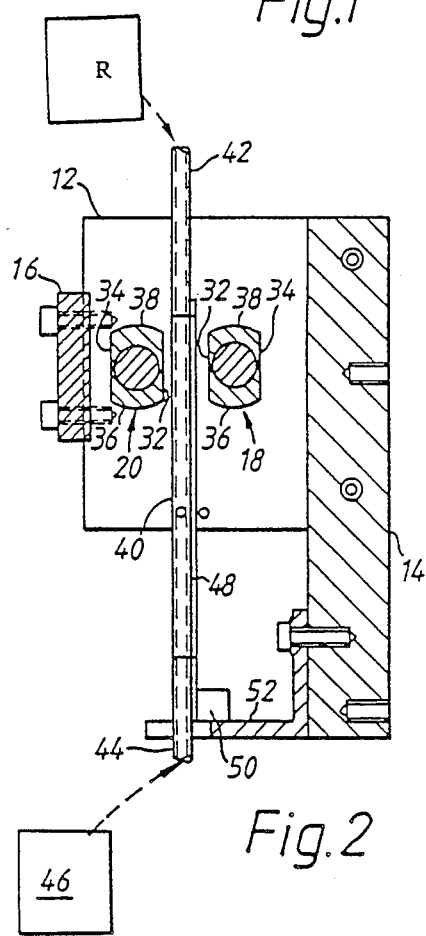
FIG. 2 is a section on line A—A of FIG. 1.

As is best seen in FIG. 2, each of the rollers 18 and 20 is provided with first and second diametrically opposed flats 32 and 34 and first and second diametrically opposed arcuate lobes 36 and 38. The rollers 18 and 20 are arranged upon the shafts 22 and 24 such that their respective flats 32 and 34 are parallel to one another when in the rest position illustrated.

Depending between the rollers 18 and 20 is a length of resilient flexible, deformable tubing or conduit 40, the upper end 42 of which passes to a liquid sample reservoir R. In operation, as will be described in more detail below, the liquid sample is deposited from the lower end 44 of the tubing 40, which may also be selectively connected to a vacuum source 46.

In the illustrated embodiment, the tubing 40 is attached to a carrier member 48 in the form of an elongate plate which extends along part of the length of the tubing 40 and between the rollers 18 and 20.

The operation of the device is as follows: initially, the rollers 18 and 20 are in the position illustrated, with their first flats 32 facing the tubing 40 and carrier 48 and spaced therefrom. The vacuum stage is connected to the lower end 44 of the tubing 40 and liquid from the sample reservoir is drawn therethrough. The vacuum source 46 is disconnected for example, by manual operation, by a predetermined timing cycle, or by use of suitable sensors for detecting the presence of liquid in the tubing (40). In most applications involving small bore tubes, liquid is prevented from falling through the lower end of the tube by cohesion. If necessary, however, valve means obviously could be introduced at the other end of the tube or a back pressure could be applied and the motor 30 is switched on, driving the rollers 18 and 20 clockwise and anti-clockwise respectively. As the rollers 18 and 20 rotate, the curved surfaces of their first arcuate lobes 36 impinge upon the tubing 40 and carrier 48, causing the tubing 40 to deform and constrict. As the rollers 18 and 20 continue to rotate, the tubing 40 and carrier 48 are driven upwardly, causing the liquid below the constriction created by the action of the lobes 36 to be forced downwards and deposited from the lower end 44 of the tubing 40.

Upon further rotation of the rollers 18 and 20, the second flats 34 come opposite the tubing 40 and carrier 48 which are then released and return to their original position under the influence of gravity. (A weight 50 may be attached to the lower end of the carrier 48 to facilitate this, and may also serve as a stop member in co-operation with a ledge 52 attached to the frame member 14). At this point the motor is switched off, the vacuum source may be reconnected, and the process repeated for each sample dose required.

Thus, in the example illustrated, each half turn of the rollers 18 and 20 causes a precise, discrete sample of predetermined volume to be delivered from the sample reservoir. The volume of the dose obviously depends upon the length of the curved surfaces of the arcuate lobes 36 and 38 and the bore of the tubing 40. The dose can therefore be varied, within limits, by use of different tubes of varying bore. Since the tubing 40 is simply a straight length, this is easily and conveniently done.

The configuration of the rollers may also be varied. A minimum of one flat is required (giving one dose per revolution) and, of course, a larger number of flats and lobes may be provided to give multiple doses for each revolution. Alternatively, the rollers may be made cylindrical and a servo-mechanism provided for controlling the position of the shafts to bring the rollers in and out of engagement with the tubing. In this case, the dose is controlled by the number of revolutions, or fractions of revolutions, of the rollers.

The invention thus provides a liquid metering device wherein the only part subject to appreciable wear is the flexible tubing, which is itself tough and durable. Furthermore, no moving parts come into contact with the liquid, facilitating cleaning and reducing the risk of cross-contamination.

Figure 3:
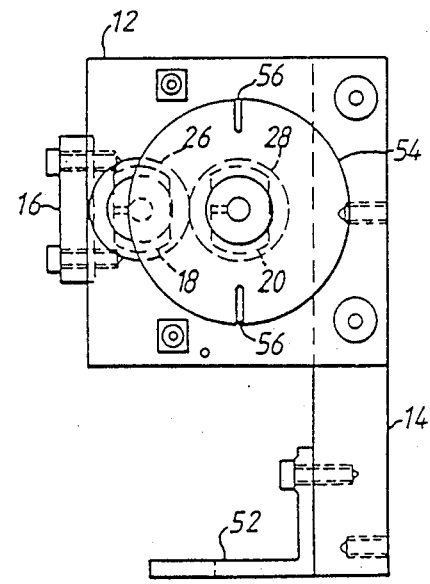
FIG. 3 is an end elevation of the device of FIG. 1 with the motor removed for clarity.

The unit is suited to fully automatic operation under electronic control. For example, FIG. 3 shows a position sensor for the rollers in the form of a disc 54 mounted upon one of the shafts 22 and 24 and having a plurality of slots 56 corresponding to the number of flats on the roller, which co-operate with a photo-sensor (not shown) to indicate the position of the rollers.

A number of variations of the device hereinbefore described will be apparent to those skilled in the art. For example, only one of the rollers need be driven, the other being replaced by a freely rotatable cylindrical roller or by a static member against which the conduit may be constricted by the action of the driven roller.

We claim:

1. A liquid metering device comprising:
   a resilient conduit,
   means for introducing a liquid into said conduit,
   means for constricting said conduit, including a first rotatable member having a curved surface and having a flat portion formed on said curved surface, and
   a second member, co-operable with said first rotatable member, and disposed relative to said first member and said conduit, such that said conduit may be constricted therebetween, whereby rotation of said first rotatable member causes said conduit to be alternately constricted when said curved surface of said first rotatable member impinges upon said conduit, and released when said flat portion is presented to said conduit, and
   means for varying the positions of said conduit relative to said first rotatable member and said second member.

2. A liquid metering device as set forth in claim 1, wherein rotation of said first rotatable member when constricting said conduit causes said conduit to move along its longitudinal axis relative to said first rotatable member and said second member.

3. A liquid metering device as set forth in claim 1, wherein said second member comprises a second rotatable member subsequently identical to said first rotatable member and synchronized therewith.

4. A liquid metering device as set forth in claim 3, further including drive means for rotating said first and second rotatable members in opposite directions.

5. A liquid metering device as set forth in claim 1, wherein said conduit depends between said first rotatable member and said second member and is driven upwardly, relative to said first rotatable member from a lowermost position when constricted between said first rotatable member and said second member.

6. A liquid metering device as set forth in claim 5, wherein said conduit returns to said lowermost position under the influence of gravity when it is released.

7. A liquid metering device as claimed in claim 1, wherein said means for introducing liquid into said conduit comprises a liquid reservoir connected to one end of said conduit and a vacuum source selectively connectable to another end of said conduit.

8. A liquid metering device as set forth in claim 1, and further comprising position sensing means for indicating the position of said first rotatable member.

* * * * *